United States Patent
Repp et al.

(10) Patent No.: US 9,839,325 B2
(45) Date of Patent: Dec. 12, 2017

(54) SALAD SPINNER BRAKE MECHANISM

(71) Applicant: Dexas International, Ltd., Coppell, TX (US)

(72) Inventors: Timothy C. Repp, Pleasant Valley, CT (US); Thomas B. Murphy, Arlington, TX (US)

( * ) Notice: Subject to any disclaimer, the term of this patent is extended or adjusted under 35 U.S.C. 154(b) by 705 days.

(21) Appl. No.: 14/318,524

(22) Filed: Jun. 27, 2014

(65) Prior Publication Data

US 2015/0374174 A1 Dec. 31, 2015

(51) Int. Cl.
| | |
|---|---|
| A23B 5/00 | (2006.01) |
| A23N 1/00 | (2006.01) |
| A47J 43/044 | (2006.01) |
| A47J 43/24 | (2006.01) |
| F16D 65/14 | (2006.01) |
| F16D 121/14 | (2012.01) |
| F16D 125/58 | (2012.01) |

(52) U.S. Cl.
CPC ............ *A47J 43/044* (2013.01); *A47J 43/24* (2013.01); *F16D 65/14* (2013.01); *F16D 2121/14* (2013.01); *F16D 2125/585* (2013.01)

(58) Field of Classification Search
None
See application file for complete search history.

(56) References Cited

U.S. PATENT DOCUMENTS

| | | | | | |
|---|---|---|---|---|---|
| 3,741,350 | A | * | 6/1973 | Knapp | F16D 65/18 188/106 F |
| 4,209,916 | A | * | 7/1980 | Doyel | A47J 43/24 210/360.1 |
| 5,064,535 | A | * | 11/1991 | Hsu | A47J 47/005 210/380.1 |
| 5,562,025 | A | * | 10/1996 | Bull | A47J 43/24 210/360.1 |
| D411,720 | S | | 6/1999 | Lillelund | |
| 6,018,883 | A | | 2/2000 | Mulhauser | |
| 6,510,785 | B1 | * | 1/2003 | Margolin | A47J 43/24 34/184 |
| 6,622,618 | B1 | * | 9/2003 | Glucksman | A47J 43/24 210/360.1 |
| D504,053 | S | | 4/2005 | Bertulis | |

(Continued)

OTHER PUBLICATIONS

Dexas International, Ltd., Presentation photo 1 of Salad Spinner Product #1, published in USA as of Sep. 1, 2012.

(Continued)

*Primary Examiner* — David Angwin
*Assistant Examiner* — Gyounghyun Bae
(74) *Attorney, Agent, or Firm* — Daniel V. Thompson (57) ABSTRACT

A salad spinner has a hub connected in a rotary driving relationship to a colander mounted within the salad spinner for rotation about an axis of rotation. A brake provides braking force to the hub coaxially with the colander axis of rotation. The brake includes a spring-loaded button located coaxially with the colander axis of rotation and an actuation element between the button and the hub for applying coaxial, linear force from the button to the hub for braking. A drive plate is connected in a rotary driving relationship to the hub, and the button is constrained for co-rotation with the drive plate and linear motion relative the drive plate.

4 Claims, 8 Drawing Sheets

(56) References Cited

U.S. PATENT DOCUMENTS

| | | | |
|---|---|---|---|
| 6,899,021 B2 * | 5/2005 | Riede | A47J 43/24 34/58 |
| D506,903 S | 7/2005 | Lee | |
| D515,865 S | 2/2006 | Kim | |
| 7,111,546 B2 * | 9/2006 | Siegel | A47J 43/24 34/194 |
| D530,989 S | 10/2006 | Mellen et al. | |
| D608,603 S | 1/2010 | Hauser | |
| 7,681,495 B2 * | 3/2010 | Wan | A47J 43/1018 34/58 |
| D629,264 S | 12/2010 | Curtin | |
| 7,921,769 B2 * | 4/2011 | So | A47J 43/24 210/380.1 |
| 7,975,605 B2 * | 7/2011 | Wan | A47J 43/24 34/58 |
| D655,605 S | 3/2012 | Baughman | |
| 8,215,230 B2 * | 7/2012 | Curtin | F26B 5/08 99/495 |
| D672,211 S | 12/2012 | Nie | |
| D682,048 S | 5/2013 | Perry et al. | |
| 8,539,693 B2 | 9/2013 | Pery et al. | |
| 8,578,844 B2 * | 11/2013 | Holcomb | 241/92 |
| D706,075 S | 6/2014 | Houser | |
| 9,468,340 B2 * | 10/2016 | So | A47J 43/24 |
| 9,756,983 B2 * | 9/2017 | Myoung | A47J 43/044 |
| 2007/0137504 A1 * | 6/2007 | Wan | A47J 43/24 99/495 |
| 2007/0180727 A1 * | 8/2007 | Wan | A47J 43/1018 34/58 |
| 2008/0210103 A1 * | 9/2008 | Wan | F26B 5/08 99/495 |
| 2009/0098259 A1 | 4/2009 | McEllen | |
| 2009/0114104 A1 * | 5/2009 | Sawhney | A47J 43/24 99/495 |
| 2010/0251906 A1 | 10/2010 | Repp | |
| 2010/0263555 A1 * | 10/2010 | Mah | A47J 43/24 99/495 |

OTHER PUBLICATIONS

Dexas International, Ltd., Presentation photo 2 of Salad Spinner Product #2, published in USA as of Sep. 1, 2012.

* cited by examiner

Fig. 7B ns, and apparently no thought was given to coaxially mounting the brake with the rotating mechanism. One major drawback of an off-axis, radially-displaced brake is that substantial unbalancing moment is applied to the spinning mass, making the braking action rough, loud, hard to control, and a generally unpleasant end to an otherwise elegant operation. Another drawback of the radially-displaced type of brake is that the support system for the rotating mass must be heavier to provide resistance to the unbalancing moment of the brake.

There is a need, then, for a salad spinner device that provides a smooth and balanced braking action applied coaxially with the colander axis of rotation.

SALAD SPINNER BRAKE MECHANISM

CROSS-REFERENCE TO RELATED APPLICATIONS

This is a continuation-in-part of U.S. patent application Ser. No. 13/898,227 filed on May 20, 2013, which was a continuation-in-part of U.S. patent application Ser. No. 12/753,300 filed on Apr. 2, 2010, now abandoned, which was a non-provisional application based on U.S. Provisional Patent Application Ser. No. 61/211,653 filed on Apr. 2. 2009.

TECHNICAL FIELD

The present invention relates to an improved food preparation product. More particularly, it is a rotatable greens drying device (hereinafter, salad spinner) that decreases the time and effort required to dry washed greens by use of an improved brake mechanism.

BACKGROUND OF THE INVENTION

Salad spinner devices are common and not new to the marketplace. All known salad spinners are designed to create centrifugal force that expedites removal of residual water which accumulates after rinsing leafy vegetables. This is done to avoid soggy greens which can detract from the texture and quality of a salad. Each known device in the prior art employs a mechanical method for swiftly rotating a perforated container filled with rinsed greens inside a vessel that captures and contains water after its removal. This mechanical method is not the subject of this disclosure as it could be satisfactorily achieved by using one of several drive mechanisms already known in the public domain.

Most salad spinner devices consist of five main components: (1) a rigid and stationary exterior main bowl with (2) an exterior lid, (3) an interior rotatable colander with (4) an engageable interior lid, and (5) a rotary drive device that is fastened to the exterior lid which when activated by the user, spins the interior lid and colander in unison. The exterior lid, rotary drive, and interior lid are usually combined in a lid assembly. The user typically will fill the colander with leafy greens and wash them thoroughly under a faucet. Then, the dripping colander is placed inside the main bowl on a countertop, the lid assembly (containing the exterior lid, interior lid and the rotary device) is placed on top of the bowl and the user activates the rotary drive device to create the centrifugal force needed to remove water from the greens. The colander rotation has to stop before the dewatered greens can be removed.

A brake is an additional component that is sometimes found on salad spinners. The colander, its contents, and the interior lid represent a considerable mass that, when rotating together in a low-friction environment, take a long time to slow back down to stationary when application of spinning force is ceased. Simpler devices without a brake require the user to either (1) simply wait for the rotation to decay or (2) remove the lid and stop the fast-spinning colander by hand. The former method adds considerable time to the operation, while the latter technique is awkward and messy.

One type of brake known since at least French Patent 743,906, issued Jan. 16, 1933, uses a simple exterior lid-mounted elastic button 21 to selectively contact a point on the interior lid located off-axis, that is, radially-outward of the center. A latter example of the simple radially-displaced elastic brake is shown in U.S. Pat. No. 6,018,883 to Mulhauser. The rotating mechanism occupies the center of both

SUMMARY OF THE INVENTION

The salad spinner of the present invention includes a brake that is coaxially applied with the colander axis of rotation.

BRIEF DESCRIPTION OF THE DRAWINGS

A more complete understanding of the invention and its advantages will be apparent from a review of the Detailed Description in conjunction with the following Drawings, in which.

DETAILED DESCRIPTION

Referring initially to FIGS. 1-6, where like numerals indicate like and corresponding elements, the salad spinner has a support frame 1 configured to be shifted from a collapsed state for storage to an extended state for use. An internal colander 3 (FIG. 2) is also collapsible and extendable.

In operation, to begin use, the support frame 1 and colander 3 are first extended to their use configurations. Leafy greens are placed inside the colander 3, washed with water and spread evenly. The removable drive assembly 5, with attached fan 7 and actuator 8, is removably coupled to the support frame 1 and colander 3 by placing it on top of the support frame 1 directly above the colander 3. The removable drive assembly 5 self-locates with the fan 7 affixed to the colander rim 3a so as to transfer driving input from actuator 8 and the mechanical output of the removable drive assembly 5 to the fan 7 and attached colander 3. The removable drive assembly 5 is then actuated, gradually increasing speed to rotate the colander 3 about an axis of rotation 9 (FIGS. 1 and 6) to provide centrifugal force, which removes water from the leafy greens. As speed increases, radial vanes 11 within the removable drive assembly 5 permit dry air to flow into the fan 7 and be forced through the leafy greens and the colander holes. Braking force is applied via button 14, as will be described in greater detail below. The user then lifts the removable drive assembly 5 from the top of the support frame and either removes the leafy greens by hand, or alternatively lifts out the colander 3 from the support frame 1 and pours the leafy greens into a separate bowl for consumption.

Further details regarding the salad spinner construction and operation are found in U.S. patent application Ser. No. 13/898,227 filed on May 20, 2013, and U.S. patent application Ser. No. 12/753,300 filed on Apr. 2, 2010, and the disclosures of each are included by reference thereto as if fully set forth herein.

Figure 1:
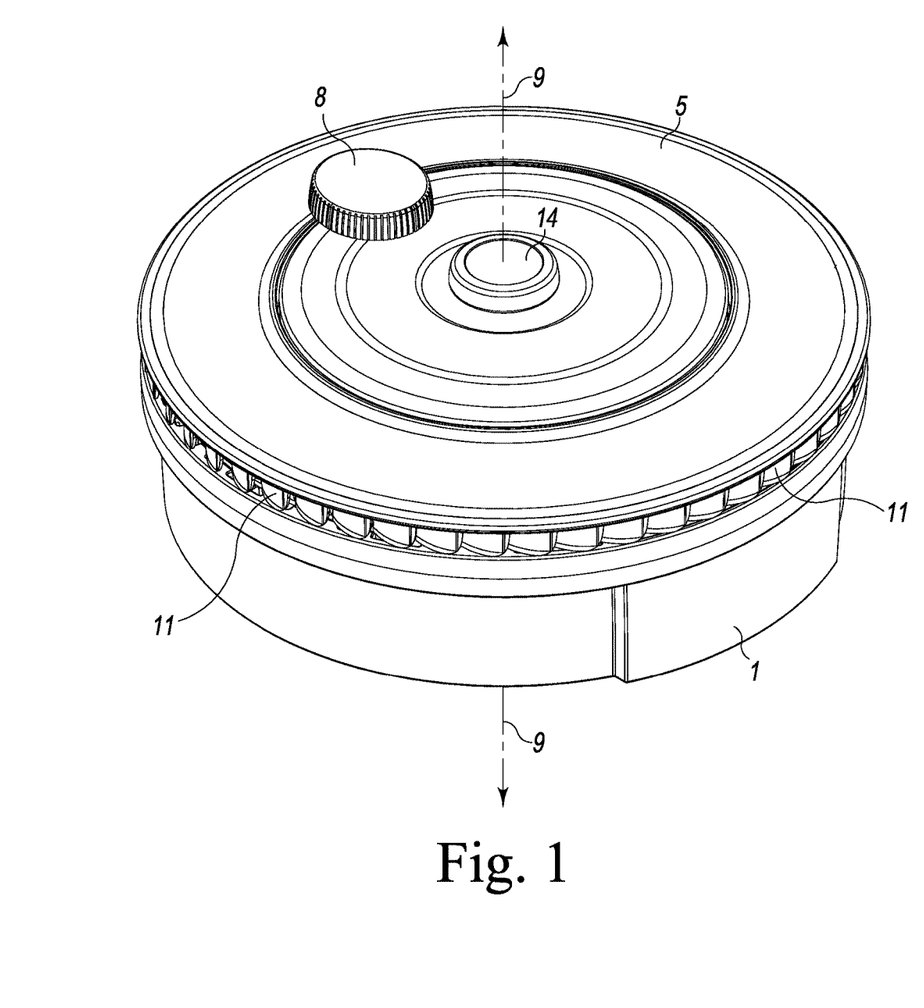
FIG. 1 is a perspective view of one embodiment of a salad spinner constructed in accordance with the invention, shown in a collapsed state for storage.
Figure 2:
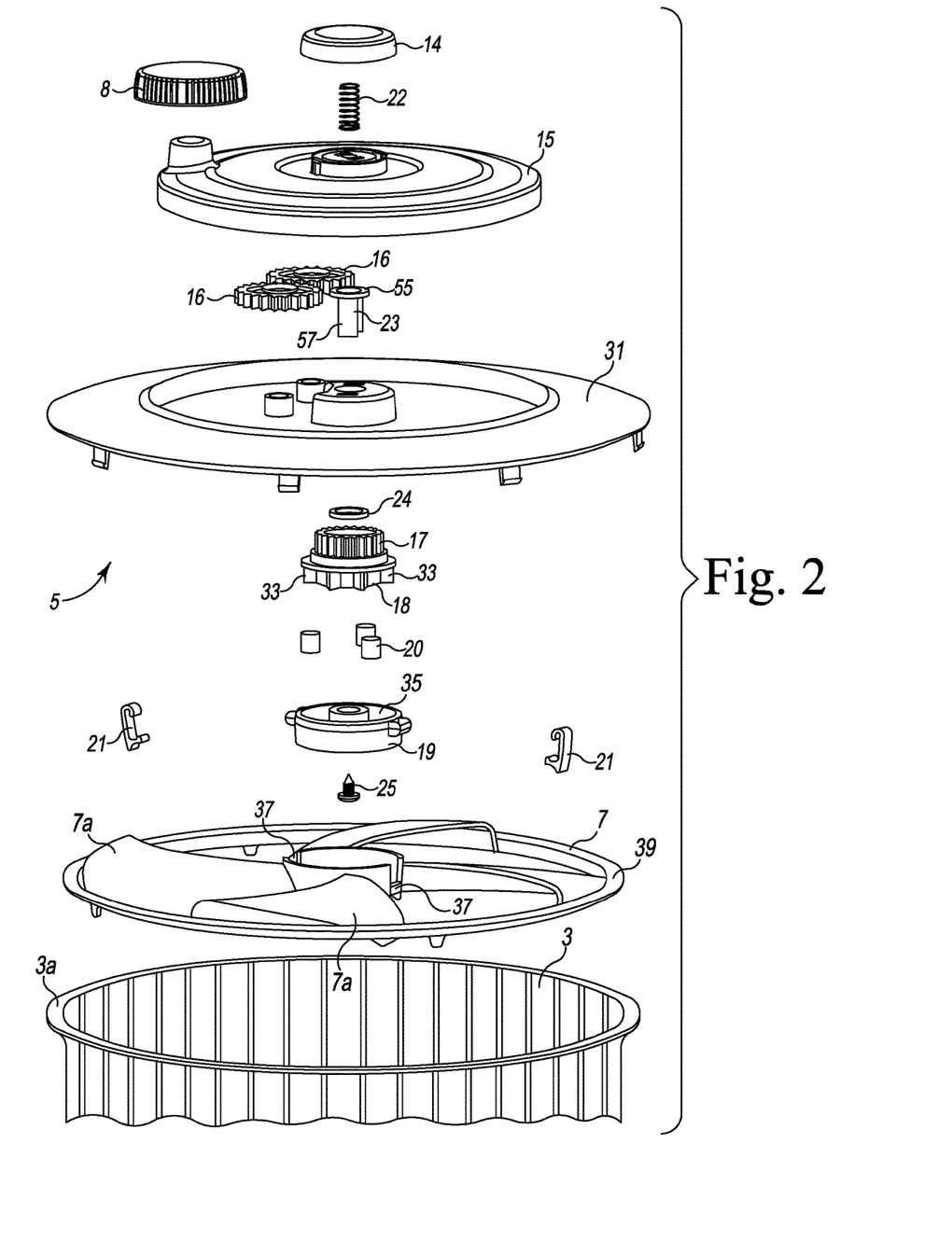
FIG. 2 is an exploded perspective view of the removable drive assembly and colander of the salad spinner of FIG. 1.
Figure 3:
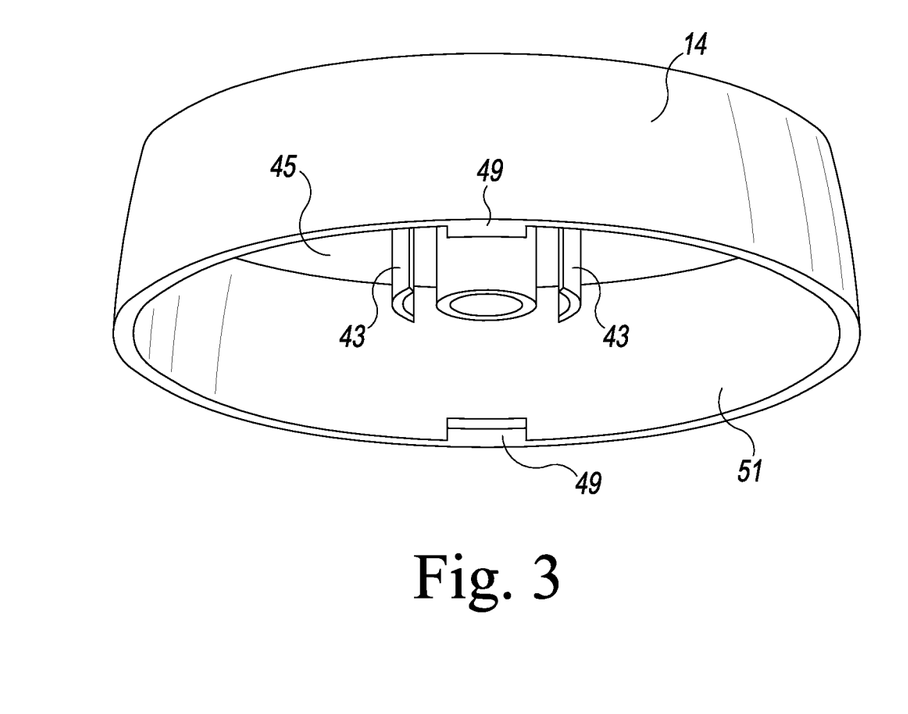
FIG. 3 is an enlarged perspective view of the underside of a brake button.
Figure 4:
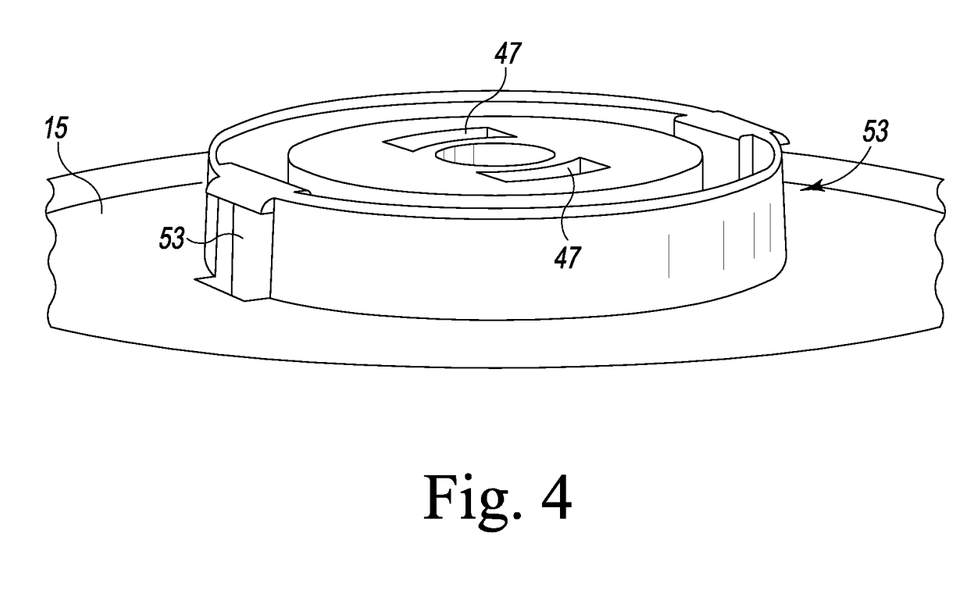
FIG. 4 is an enlarged perspective view of a portion of the drive plate for the salad spinner.
Figure 5:
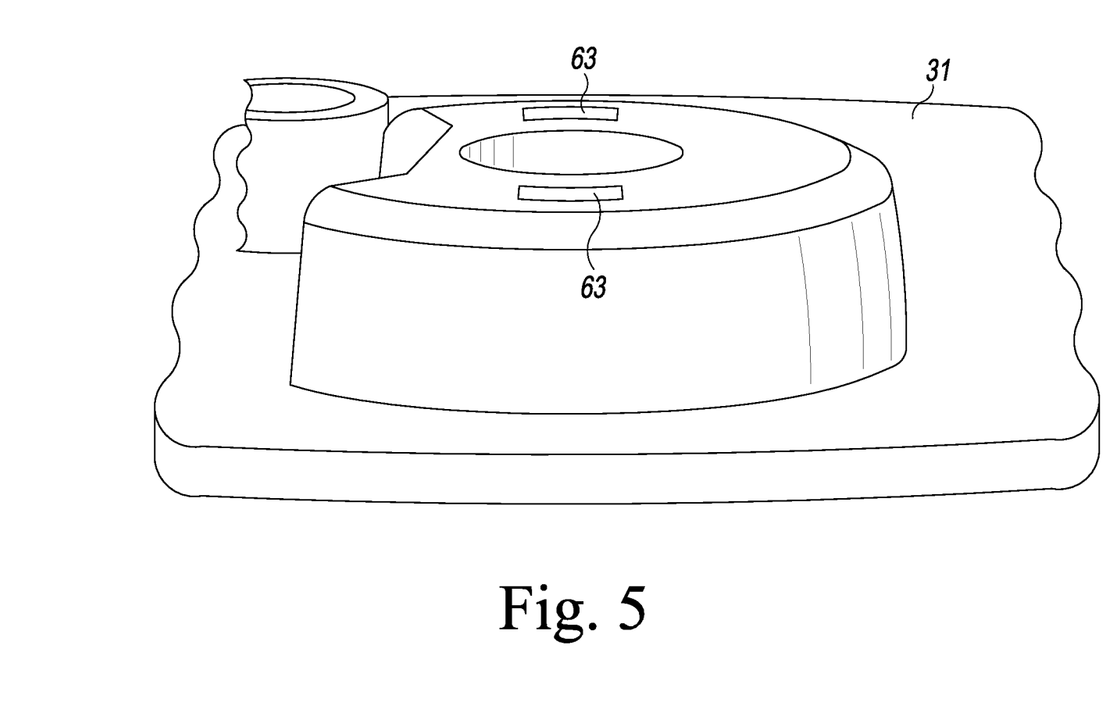
FIG. 5 is an enlarged perspective view of a portion of the top of the drive assembly.
Figure 6:
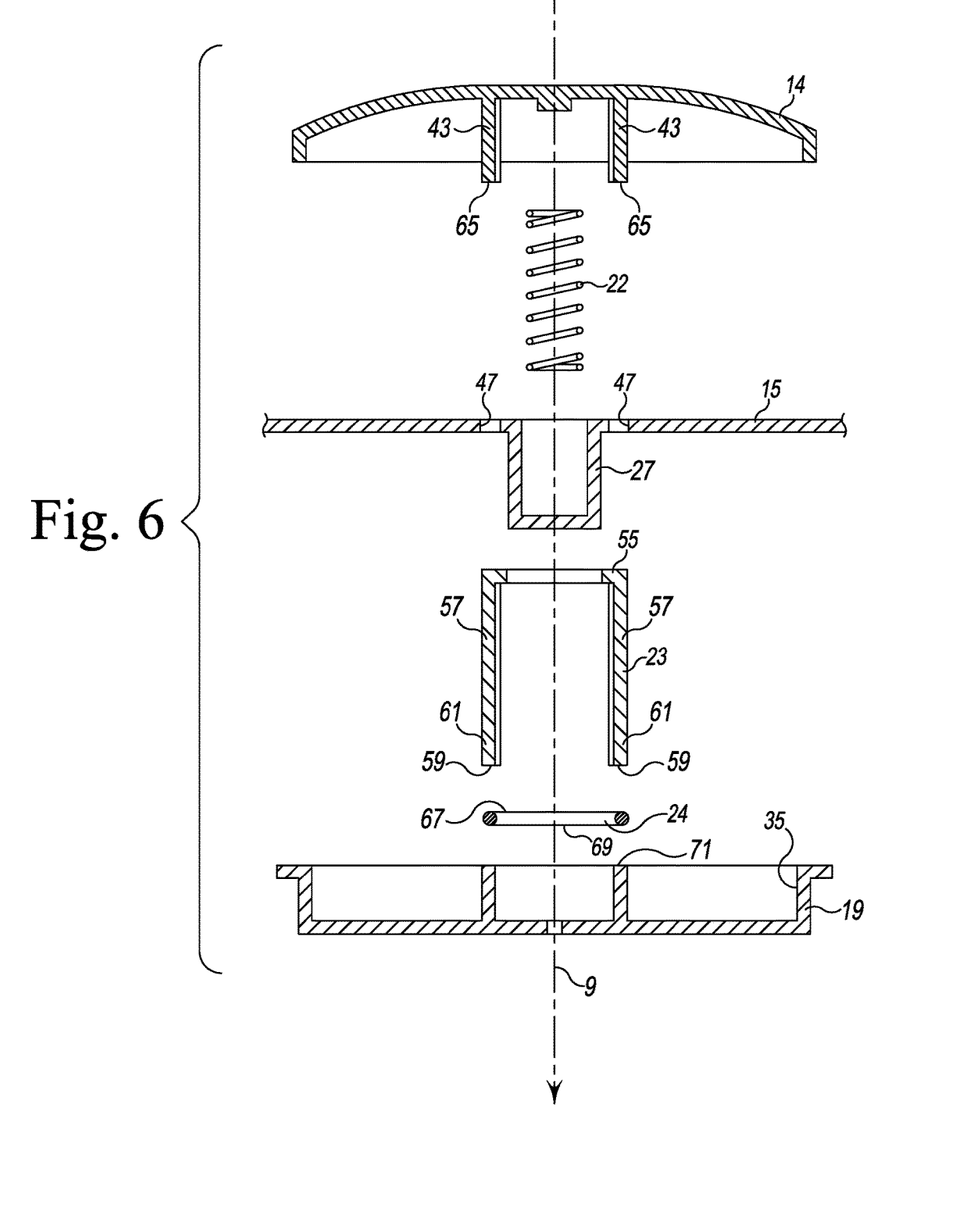
FIG. 6 is a partially broken-away, exploded, side view of the brake.

As best shown in FIG. 2, fan 7 is an air circulation device having a plurality of blades 7a angled with respect to a direction of rotation caused by the drive assembly 5, such that air from the outside of the salad spinner enters through radial vanes 11 and is forced into the colander and out the colander holes.

In general, drive assembly 5 includes the actuator 8 connected to a drive plate 15. Drive plate 15 is connected via a ring gear (shown in FIG. 6 of U.S. patent application Ser. No. 13/898,227 filed on May 20, 2013) in the bottom of drive plate 15 and idler gears 16 to a geared, one-way clutch member 18, which drives a hub 19 by way of clutch cylinders 20. Hub 19 is attached to fan 7 by way of dogs 21. The coaxial brake, to be described in more detail below, includes button 14, spring 22, brake actuation element 23, and brake ring 24. Fastener 25 rotatably mounts the hub 19 to a depending axle stub 27 (FIG. 6) of the drive plate 15. Fastener 25 is drawn tightly enough to linearly and coaxially fix hub 19 but is sufficiently loose to allow free relative rotation between hub 19 and drive plate 15.

Describing now the drive assembly 5 and its coaxial brake in more detail, the salad spinner includes the drive assembly 5 removably coupled to a colander 3. The actuator 8 transmits a driving input applied to the actuator 8 to rotate the colander 3 about an axis of rotation 9. The actuator 8 is rotatably mounted to a drive plate 15 a radial distance from the axis of rotation 9 such that the drive plate 15 and actuator 8 are a crank mechanism for imparting rotary force around axis of rotation 9.

A transmission for rotating force provided by the crank includes a ring gear on the drive plate 15 (shown in FIG. 6 of U.S. patent application Ser. No. 13/898,227 filed on May 20, 2013). A pair of idler gears 16 are engaged with each other, and one idler gear 16 is also engaged to the ring gear. The other idler gear 16 is also engaged with a driven gear 17 fixed to a clutch member 18, such that rotary force is transmitted from the ring gear, through the idler gears, to driven gear 17 on the clutch member 18. Idler gears 16 are rotatably mounted to the drive assembly top 31, which top 31 remains hand-held and stationary during use.

A one-way, freewheel clutch is also provided. The clutch includes the clutch member 18, which has arms 33 below driven gear 17 loosely constraining the plurality of clutch cylinders 20. Hub 19 has an internal clutch surface 35 for frictional engagement with the clutch member 18 by way of the clutch cylinders 20 and the arms 33 when the drive plate 15 is rotated in one direction and for freewheeling disengagement when the drive plate rotation speed is less than the rotation speed of the hub.

The hub 19 is adapted and arranged to be connected in a rotary driving relationship to the colander 3 for rotation. In the preferred embodiment, the hub and colander connection includes a pair of diametrically opposed dogs 21 pivotally connected to the hub 19. The dogs 21 engage a pair of corresponding fan slots 37 on fan 7. Fan 7 has an outer rim 39 frictionally engaged with the outer rim 3a of the colander 3.

The coaxial brake selectively applies braking force to the hub 19 coaxially with the colander axis of rotation 9, which is the essential feature of this invention. The coaxial brake includes button 14 fixed to the drive plate 15. Button 14 is constrained for linear motion with respect to the drive plate 15 by a plurality of semi-cylindrical button fingers 43 extending vertically-downward from an internal bottom surface 45 of the button 14. Button fingers 43 extend through loosely-fitted, cooperating, semi-cylindrical finger holes 47 in the drive plate 15, such that linear motion is permitted but corotation of the button 14 and drive plate 15 is provided. Button 14 outward linear motion is constrained by engagement tabs 49 extending inwardly from an internal side surface 51 of the button 14. The engagement tabs 49 cooperate with engagement slots 53 on the drive plate 15 to establish a limit on outward linear motion of the button 14. Coil spring 22 is retained by the button 14 and drive plate 15 and is adapted and arranged to urge the button 14 outwardly away from the drive plate 15.

The brake actuation element 23 has an upper ring 55, two semi-cylindrical actuation arms 57 depending from the upper ring 55, and a brake surface 59 at the bottom 61 of each actuation arm 57. The actuation arms 57 extend vertically-downward from the upper ring 55 through loosely-fitted, cooperating, semi-cylindrical arm holes 63 in the drive assembly top 31. The upper ring 55 is closely-adjacent to bottoms 65 of the button fingers 43 to receive coaxial, linear force from linear motion applied to the button 14. Drive assembly top 31 remains stationary in all phases of operation of the salad spinner, so brake actuation element 23 does not rotate but is allowed linear relative motion with respect to the drive assembly top 31.

Brake ring 24 is located closely-adjacent to the brake surfaces 59 at the bottoms 61 of the actuation arms 57. Brake ring 24 is a resilient, toroidal ring with a top surface 67 adjacent to the bottoms 61 of the actuation arms 57. Top surface 67 receives coaxial, linear force transmitted by the brake actuation element 23 from the button 14. Brake ring 24 also has a bottom surface 69.

A braked surface 71 is formed on the hub and located closely-adjacent to the brake ring bottom surface 69. The braked surface 71 is located within the hub 19 to receive coaxial, linear force applied by the brake ring bottom surface 69. The coaxial, linear force is transmitted to the hub by the brake ring 24, brake actuation element 23, and button 14.

Figure 7A:
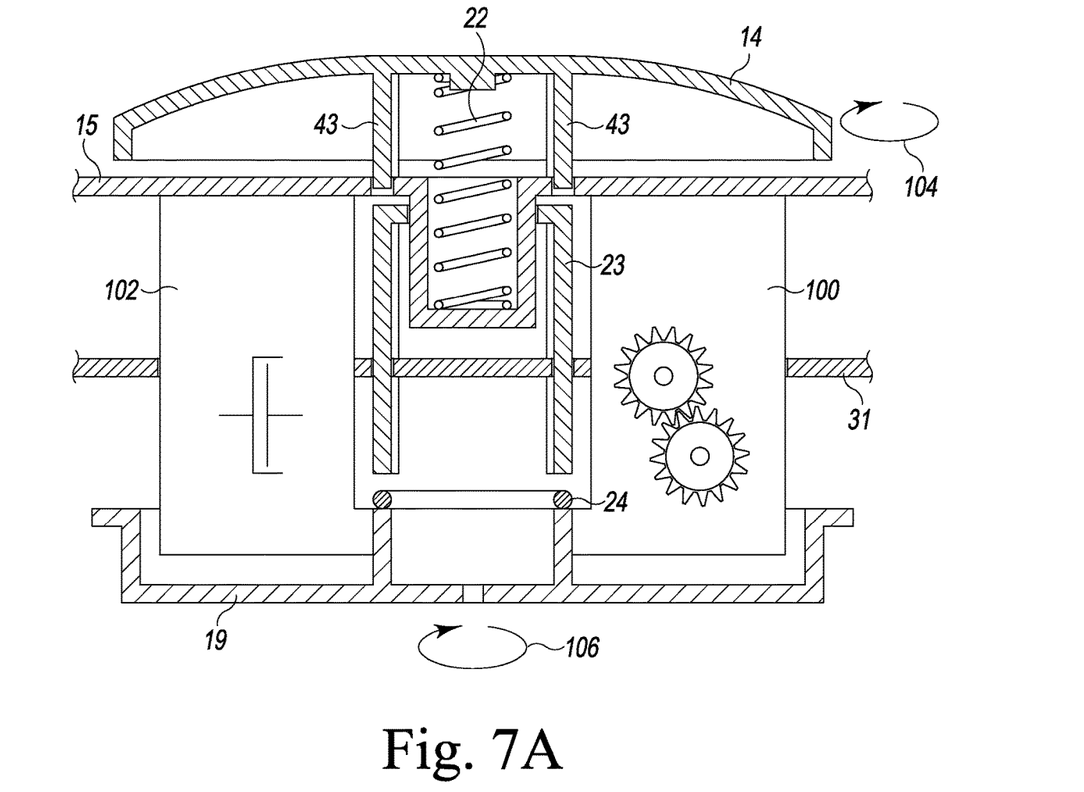
FIG. 7A is a diagrammatic view of the brake and rotary drive device with rotating force applied and the hub rotating.
Figure 7B:
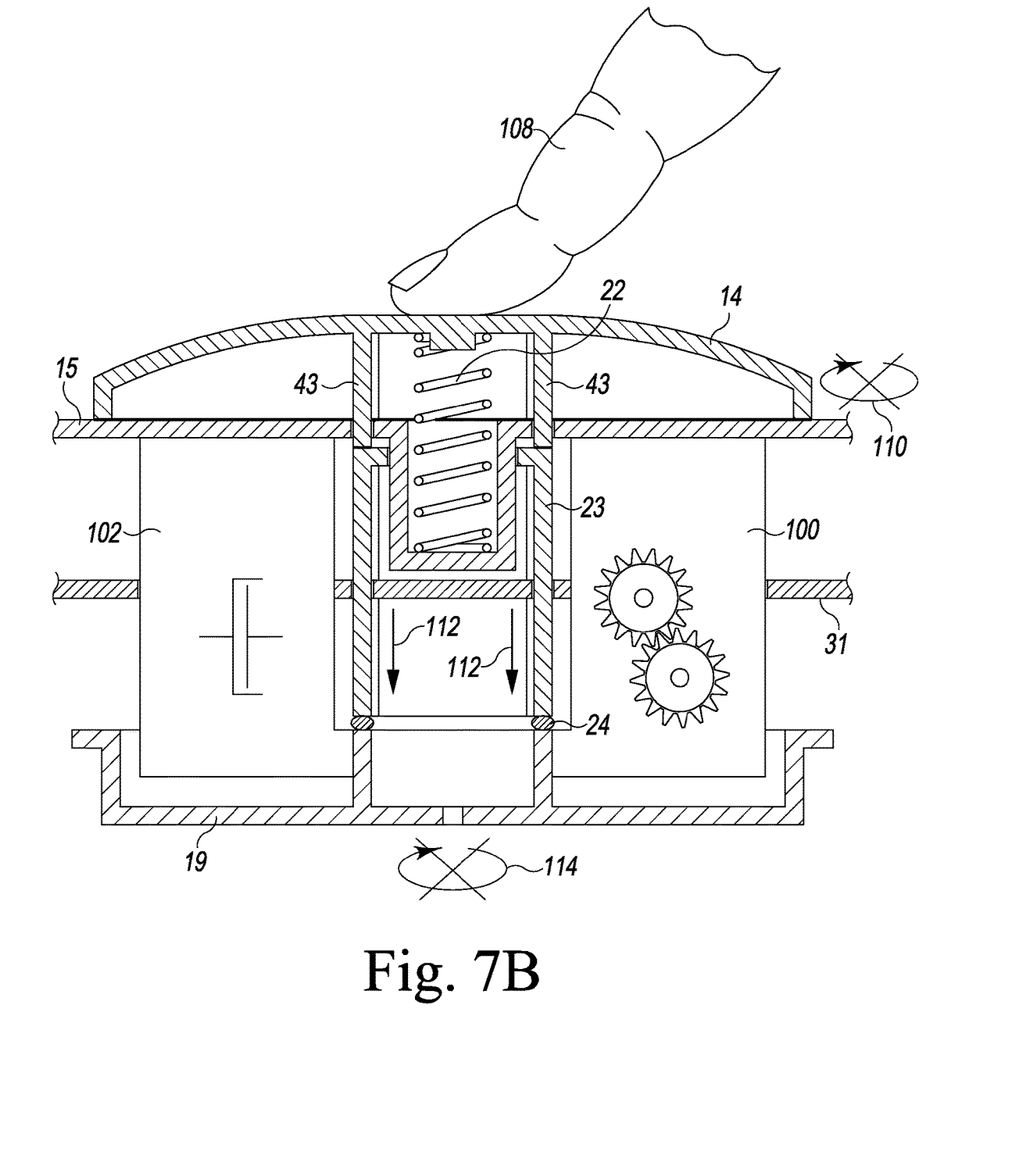
FIG. 7B is a diagrammatic view of the brake and rotary drive device with braking force applied and the hub not rotating.

Referring now to FIGS. 7A and 7B, which are diagrammatic views illustrating the invention in operation, FIG. 7A shows the salad spinner with the drive assembly and hub rotating, and FIG. 7B shows the drive assembly not spinning and the coaxial brake being applied to the hub.

In FIG. 7A, drive plate 15 is connected to hub 19 by way of transmission 100 and one-way freewheel clutch 102. As explained previously, hub 19 is connected to the fan 7 which in turn is connected to colander 3. Clutch 102 engages when the drive plate rotation rate exceeds the rotation rate of the hub, fan and colander. Drive plate 15 and hub 19 are rotating, as shown by arrows 104 and 106, respectively. Top button 14 is biased upwardly by spring 22, so there is no coaxial linear force being applied by button fingers 43 to the brake actuation element 23, which allows brake ring 24 and hub 19 to freely rotate.

In FIG. 7B, a user's finger 108 is pushing button 14, causing it to linearly move downwardly until it contacts drive plate 15, which is now stationary as shown by arrow 110. Button fingers 43 now contact the brake actuation element 23, which in turn contacts brake ring 24 and squeezes it between brake actuation element 23 and hub 19. Coaxial brake force is thus applied as shown by arrows 112, and hub 19 has stopped rotating as shown by arrow 114.

Though it is intended to fully describe the invention as set forth here, it is reasonable to assume that one skilled in the art could adjust, modify, subtract or adapt certain aspects of this salad spinner device without departing from its original scope. The implementation of individual or combined improvements disclosed here as part of another salad spinner device would be possible. For example, one variation would be to omit the collapsibility of the colander and employ a rigid version. Still another example would be to support or suspend this salad spinner device by another method such as with folding legs or a rigid outer bowl. The colander itself could, in fact, be freestanding—its lower end engaging with an electronic or manual drive component placed on the floor of a sink.

Various known drive mechanisms could include pull-chord escapements, levers, gear sets, plungers, and electric motors. Again, these mechanisms are not the subject matter of this disclosure. The gist of this improved salad spinner is that a coaxial brake is employed. The recommended materials will likely be, but are not limited to rigid and elastomeric plastic or metal.

While the invention has been illustrated and described as embodied in a preferred salad spinners, it is not intended to be limited to the details shown, since it will be understood that various omissions, modifications, substitutions and changes in the forms and details of the devices illustrated in their operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A salad spinner comprising:
a hub adapted and arranged to be connected in a rotary driving relationship to a colander mounted within the salad spinner for rotation about an axis of rotation;
a brake adapted and arranged to provide braking force to the hub coaxially with the colander axis of rotation;
with the brake including a spring-loaded button located coaxially with the colander axis of rotation and an actuation element to brake the colander, the actuation element having a braking surface and being located between the spring-loaded button and the hub for applying coaxial, linear force from the button to the hub for braking; and
with a drive plate connected in a rotary driving relationship to the hub, and the button being constrained for co-rotation with the drive plate and linear motion relative the drive plate.

2. The salad spinner of claim 1 with a stationary drive assembly top, the drive plate being located above the drive assembly top, the hub being located below the drive assembly top, and the actuation element extending through the drive assembly top.

3. The salad spinner of claim 2 with the actuation element being constrained for non-rotation with the drive assembly top and linear motion relative the drive assembly top.

4. The salad spinner of claim 3 with a resilient toroidal ring located between the hub and the actuation element and adapted to be squeezed between the hub and the actuation element when the button is pushed.

\* \* \* \* \*